Sept. 20, 1960   J. E. CANDLIN, JR., ET AL   2,953,102
SUSPENSION SYSTEM
Filed March 16, 1956   3 Sheets-Sheet 1
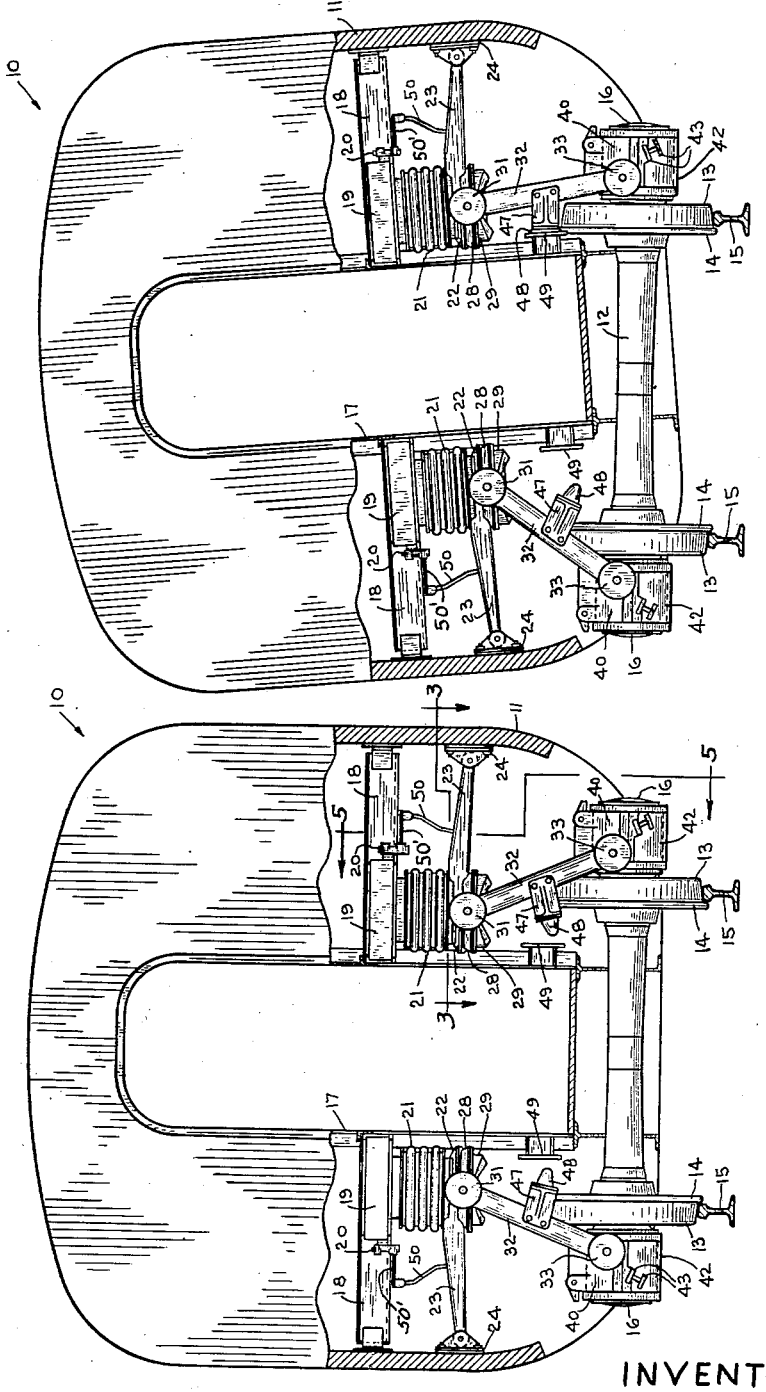
INVENTORS
JAMES E. CANDLIN JR.
ROBERT W. LANMAN
WILLIAM VAN DER SLUYS
BY Cromwell, Greist & Warden ATTORNEYS

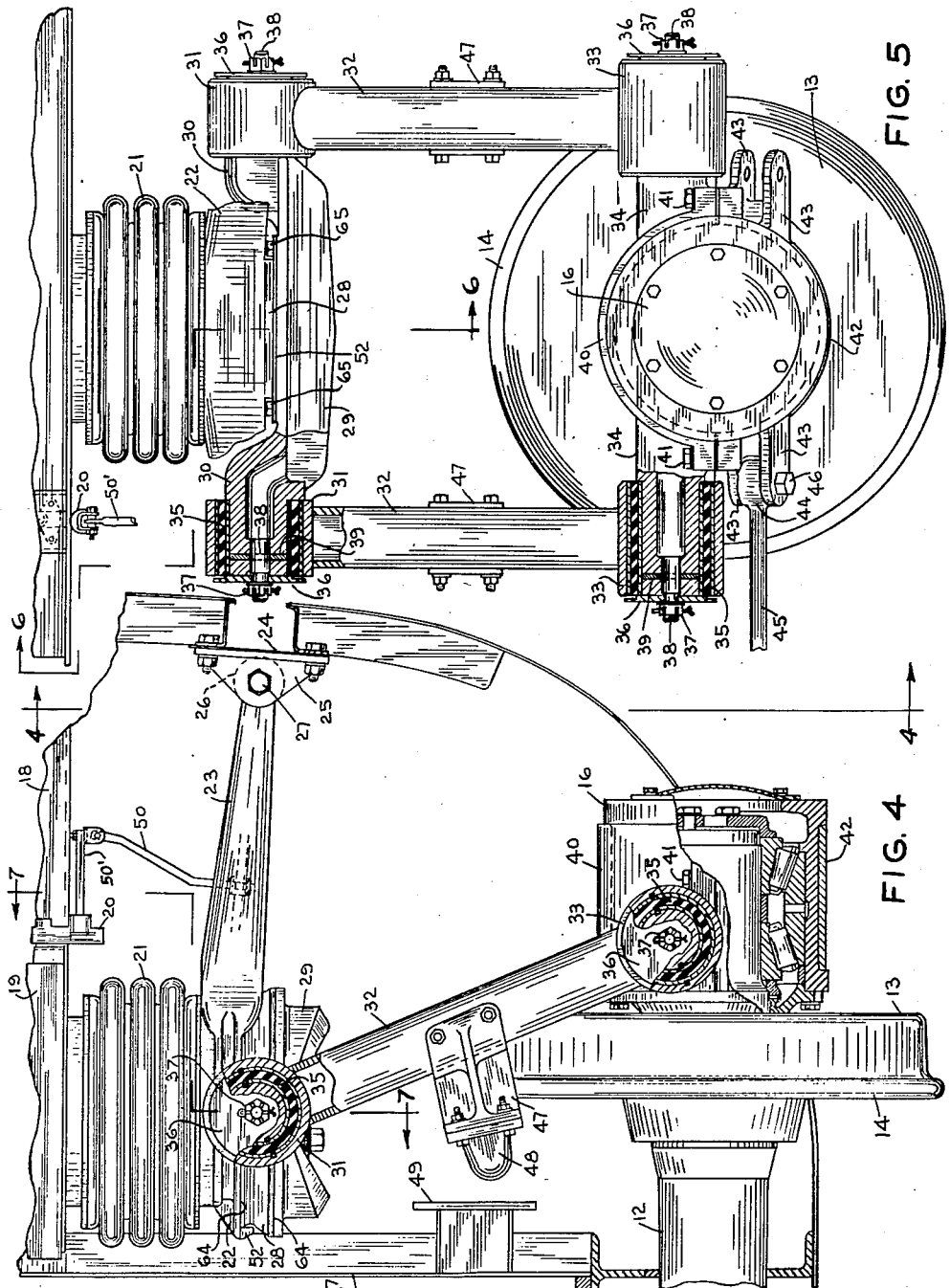

Sept. 20, 1960
J. E. CANDLIN, JR., ET AL
2,953,102
SUSPENSION SYSTEM
Filed March 16, 1956
3 Sheets—Sheet 3
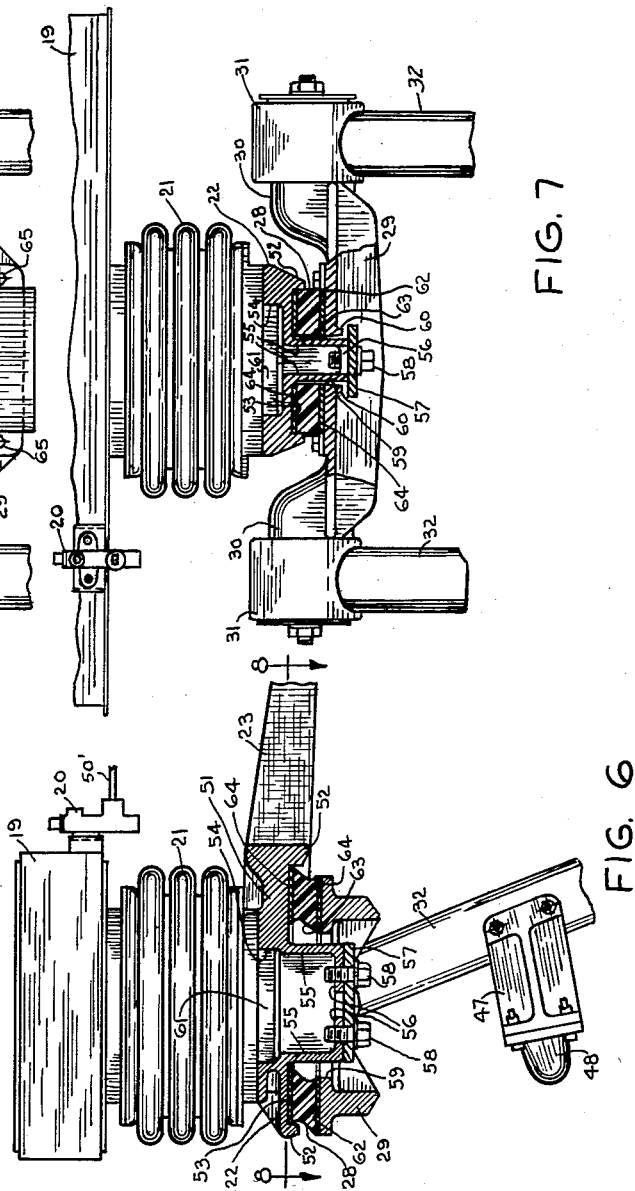
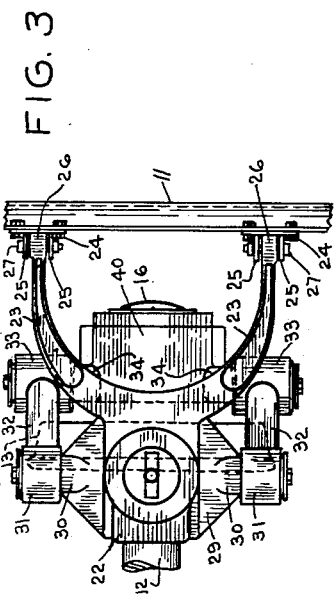
INVENTORS
JAMES E. CANDLIN JR.
ROBERT W. LANMAN
WILLIAM VAN DER SLUYS
BY *Cromwell, Greist & Warden* ATTORNEY

United States Patent Office 2,953,102
Patented Sept. 20, 1960

2,953,102

SUSPENSION SYSTEM

James E. Candlin, Jr., Lansing, Ill., Robert W. Lanman, Hammond, Ind., and William Van Der Sluys, Homewood, Ill., assignors to Pullman-Standard Car Manufacturing Company, Chicago, Ill., a corporation of Delaware Filed Mar. 16, 1956, Ser. No. 571,868

6 Claims. (Cl. 105—168)

The present invention relates generally to an improved suspension system for use with a vehicle body in resiliently mounting the same with respect to a wheel-carrying axle to allow limited relative movement therebetween. More specifically, the present invention is directed to an improved suspension system which includes the provision of a resilient interconnection between certain elements thereof which allows the axle to be limitedly turned in a substantially horizontal plane with respect to the vehicle body, the resilient connection cooperating with other elements of the system to allow the relative turning movement and upon the relieving of the turning forces applied thereto, the inherent resiliency of the connection acting either independently or in cooperation with other elements to return the axle to its original predetermined angular relation with respect to the vehicle body.

In designing a vehicle body suspension system it is desirable to provide means which allow the vehicle body to bank or roll laterally to a limited extent with respect to the axle upon the negotiation of curves in response to the action of centrifugal force. Improvements along these lines have been realized particularly with respect to suspension systems designed for use with lightweight, high speed railway cars. In the manufacture of such cars for operation at high speeds, it is desirable to provide the car with a low center of gravity and allow the car to bank or roll laterally with respect to the axle in response to the action of centrifugal force when the same negotiates a curve at high speeds. With proper banking action the railway car may safely and comfortably negotiate curves at higher operational speeds. In the operation of such cars it is further desirable to allow the axle to be steered or turned relative to the car body upon the rounding of a curve in the roadbed. By steering the axle and the wheels carried thereby into and out of a curve, the tendency of the wheel flanges to climb the outer rail is eliminated and the riding conditions and operational sound conditions are greatly enhanced.

The improved suspension system of the present invention is particularly adapted for use with such lightweight, high speed railway cars. These cars are normally single axle cars which are interconnected with one another in load-bearing support. The single axle carried by each car is mounted with respect to the car body near one end thereof, thereby providing a wheel-supported end and a car-supported end. The car-supported end is connected in load-bearing support with a wheel-supported end of an adjacent car and the total number of axles necessary to support a train consist formed from a plurality of such cars is materially reduced. As a result, the total weight of the train is materially reduced and this feature taken in conjunction with additional features of construction provide a lightweight train which may be operated at speeds in excess of operational speeds of conventional trains.

While the following description illustrates the use of the improved suspension system of the present invention with lightweight, high speed cars of the type described above, it should be understood that by so illustrating the invention it is not intended to limit the scope thereof. Furthermore, the specific improvement to be described is readily adapted for use in many different forms of suspension systems. However, use of the improvement in the particular suspension system to be described provides certain advantages arising from improved cooperative functioning of the elements of the particular system.

It is an object of the present invention to provide an improved suspension system for use in resiliently mounting a vehicle body with respect to a wheel-carrying axle, which system is capable of allowing the axle to limitedly turn with respect to the vehicle body while normally urging the axle to maintain or re-attain its initial predetermined position with respect to the vehicle body.

A further object is to provide an improved suspension system for use in mounting a vehicle body with respect to a wheel-carrying axle, which system resiliently mounts the vehicle body in a vertical relation with respect to the axle and allows the vehicle body to roll or bank laterally with respect to the axle in response to the action of centrifugal force, the system being improved by the inclusion of resilient interconnecting means which provides the axle with limited turning movement with respect to the vehicle body in response to steering forces while normally urging the axle into a predetermined position with respect to the vehicle body, the resilient means generally cooperating with the remaining elements of the system to improve the over-all functioning thereof.

Still another object is to provide an improved suspension system which includes the use of vertically acting fluid pressurized springs, lateral movement control means, spring restraining means and resilient interconnecting means between the springs and the lateral movement control means; the springs functioning primarily to carry the weight of the vehicle body in cooperation with the lateral movement control means which in turn function primarily to allow the vehicle body to bank in response to the action of centrifugal force; the spring restraining means cooperating with both the springs and the lateral movement control means to maintain the elements of the suspension system, the vehicle body and the axle in their proper operative relation with one another; and the resilient interconnecting means functioning in cooperation with the aforementioned elements to not only operatively interconnect the same and allow the axle and certain suspension system elements associated therewith to limitedly turn with respect to the vehicle body in response to steering forces, but further absorb the lateral components of any impact force transmitted axially of the lateral movement control means, the resilient interconnecting means normally urging the axle in cooperation with certain elements of the suspension system into a predetermined position with respect to the vehicle body.

Other objects not specifically set forth will become apparent from the following detailed description made in conjunction with the drawings wherein:

Fig. 1 is an end elevation partly broken away and in section of a single axle lightweight, high speed railway car provided with the improved suspension system of the present invention;

Fig. 2 is a view like Fig. 1 illustrating the banking of the car body as allowed by the suspension system during negotiation of a curve;

Fig. 3 is an enlarged fragmentary top plan view of a side assembly of the suspension system taken generally along line 3—3 of Fig. 1;

Fig. 4 is an enlarged fragmentary end elevation in partial section taken generally along line 4—4 of Fig. 5;

Fig. 5 is an enlarged fragmentary side elevation in partial section taken generally along line 5—5 of Fig. 1;

Fig. 6 is a fragmentary end elevation in partial section illustrating the resilient connection constituting an improvement of the present invention, the view being taken generally along line 6—6 of Fig. 5;

Fig. 7 is a fragmentary side elevation in partial section of the elements of Fig. 6 taken generally along line 7—7 of Fig. 4; and Fig. 8 is a sectional plan view taken generally along line 8—8 of Fig. 6.

Figs. 1 and 2 show a lightweight, high speed railway car 10 having a car body 11 associated with a single axle 12 carrying laterally spaced wheels 13 each provided with wheel flanges 14 cooperating with the inner surfaces of rails 15. The car body 11 is mounted on journal boxes 16 carried by the axle 12 outwardly of the wheels 13 by a suspension system comprising two identical side assemblies mounted on either side of a passageway frame 17. As each of the side assemblies of the suspension system are identical, only one of such assemblies will be described in connection with Figs. 3–8, like reference numerals for like elements being used in Figs. 1 and 2.

Extending transversely on either side of the passageway frame 17 are structural members 18 interconnecting the passageway frame 17 with the inner surfaces of the side walls of the car body 11. The members 18 carry reservoirs 19 which contain pressurized fluid, preferably air, delivered thereto through leveling valves 20 from a central source of supply which is not shown. The reservoirs 19 communicate with vertically acting air springs or bellows 21 which extend downwardly from the bottom surfaces of the reservoirs 19 and are formed from a compressible outer portion of rubber-like material. The springs 21 are internally fluid pressurized by air from the reservoirs 19. The vertically acting resilient springs 21 act as shock absorbers and control the vertical positioning of the car body 11 with respect to the axle 12.

The bottom portions of the air springs 21 are connected to yokes 22 which are provided with outwardly directed restraining links or arms 23 in the form of wishbones which are pivotally connected to the inner surfaces of the side walls of the car body 11 by brackets 24. As particularly shown in Fig. 3, the brackets 24 are provided with spaced ears 25 which receive therebetween eyes 26 formed integral with the ends of the arms 23. The ears and eyes 26 are provided with aligned holes through which is inserted a bolt or pin 27 pivotally attaching the arms 23 to the brackets 24 and allowing the yoke 22 to move vertically with the air springs 21 while at the same time restraining movement of the air springs 21 longitudinally or laterally of the car body 11. The eyes may be fitted with rubber bushings to minimize transmission of noise and vibration.

Operatively associated with the bottom surfaces of the yokes 22 are resilient cushion members 28 which function as biasing means in a manner to be subsequently fully described. The bottom surfaces of the resilient cushion members 28 are mounted on reinforced plates 29 which in turn are provided with trunnions 30 (see Fig. 3) which are received within cylindrical sleeves 31 integrally formed on the upper ends of downwardly and outwardly directed struts 32. The lowermost ends of the struts 32 are provided with integral cylindrical sleeves 33 which receive internally thereof trunnions 34 carried by the journal boxes 16. The cylindrical sleeves 31 and 33 of each of the struts 32 form resiliently bushed housings and internally carry rubber torsion sleeve assemblies 35 which allow limited pivotal movement of the struts 32 with respect to the trunnions 30 and 34.

Referring to Figs. 4 and 5, the rubber torsion sleeve assemblies 35 are illustrated in their operative position with respect to the ends of the struts 32. The sleeve assemblies 35 are of known design including an intermediate rubber sleeve to the inner and outer surfaces of which are bonded sleeves of rigid metal. The inner rigid sleeve of the assemblies 35 are suitably keyed to the outer surfaces of the trunnions 30 and 34 and the outer rigid sleeves are fixed as by keying to the cylindrical sleeves 31 and 33 of the struts 32. The assembled elements are retained in their operative position by use of caps 36 which are removably attached to the trunnions 30 and 34 by castellated nuts 37 received on the threaded outer ends of plugs 38. The plugs are held in axially extending drilled holes in the trunnions 30 and 34 by means of pins 39. The trunnions 34 form an integral part of saddle members 40 which are in engagement with the top surface of the journal boxes 16 and are clamped thereon by means of bolts 41—41 screwed into mating lugs on saddle members 42 fitting the bottom outer portion of the journal boxes 16. The saddle members 42 are provided on opposite sides with outwardly directed spaced ears 43 one pair of which receive therebetween an eye 44 integral with an end of a steering rod 45 and pivotally connected to the ears 43 by a bolt 46 passed through aligned holes in the ears 43 and eye 44.

The struts 32 carry inwardly directed brackets 47 (Fig. 4) which have mounted thereon resilient abutment means or stops 48 adapted to contact abutment plates 49 carried by the door frame 17. These abutment means limit the extent of lateral movement or banking of the car body 11 with respect to the axle 12 in response to the action of centrifugal force. The leveling valves 20 are operated, as will be described, by linkages 50 and 50' which extend from the valves 20 and are connected to one of the arms 23 of the yokes 22.

In the operation of the suspension system as described up to this point and with special reference to Figs. 1–5, the air springs 21 function to carry the weight of the car body 11 and regulate its vertical positioning with respect to the axle 12. As the weight of the car body is increased by loading, the air springs 21 will become compressed and the car body 11 will move downwardly toward the axle 12. In doing so the linkages 50, being fixed with respect to a restraining arm 23, will cause the linkages 50' to tilt upwardly and open the leveling valves 20 and air pressure of increased magnitude will be supplied to the reservoirs 19 from a suitable source. As a result of increasing the air pressure within the air springs 21, these springs will expand back to their original position and raise the car body 11 in a vertical direction to an extent that it will re-attain its vertical positioning with respect to the axle 12 and with the linkages 50' returning to a substantially horizontal position to close the valves 20. Upon a decrease in load the reverse functioning of the elements bleeds the air springs of excessive pressure as a result of the linkages 50' being tilted downwardly relative to the valves 20 to open the same in bleeding position. It will be noted that this particular arrangement allows automatic self-adjustment of the vertical positioning of the car body 11 with respect to the axle 12 in response to changes in the total weight of the car body 11. The innermost end portions of the arms 23 which are connected to the bottoms of the air springs 21 are held by reason of the struts 32 in substantially their original positions during downward or upward relative movement of the car body 11 in response to variations in load. The linkages 50 are attached to the arms 23 toward the inner ends thereof and, consequently, downward or upward movement of the car body 11 in response to compression or expansion of the air springs 21 results in sufficient movement of the linkages 50' to operate the leveling valves 20 in the manner described. The leveling valves 20 are known types of valves capable of feeding air into the air springs 21 or bleeding air therefrom in the manner described. The connected ends of the linkages 50 and 50' are pivotally attached to one another to provide for relative movement between the same in order to operate the valves 20 in the intended manner.

The struts 32, being pivotally connected at their ends by the rubber torsion sleeve assemblies 35, are capable of restricted pivotal movement about their ends in a plane transverse of the center line of the car body 11. By reason of the limited pivotal movement of the struts 32, the car body 11 is allowed to roll or bank with respect to the axle 12 when subjected to the action of centrifugal force. Fig. 2 illustrates the banking of the car body 11 upon the negotiation of a curve to the left as viewed. The pivot points at the ends of the struts 32 allow the car body 11 to roll laterally, the resultant of gravity and centrifugal force acting upon the car body 11 to bank the same into the curve, and the struts 32 are turned about their pivotal connection with the journal boxes 16 in a clockwise direction. The biasing action of the rubber torsion sleeve assemblies 53 functions to maintain the car body 11 in an upright position when the same is not subjected to centrifugal force of a magnitude sufficient to overcome the biasing strength of the assemblies 35. Upon completion of the rounding of a curve, the biasing action no longer being subjected to the torsional stresses caused by centrifugal force, will cause the struts 32 to return to their original position and right the car body 11. The abutment means or bumpers 48 mounted intermediate the ends of the struts 32 limit the extent of body roll or banking of the car body 11 by abutment with a contact plate 49. This limiting action prevents overbanking of the car body 11 as well as damage to the rubber torsion sleeve assemblies by the action of excessive torsional forces.

During the banking of the car 10 the air springs 21 and restraining arms 23 maintain their respective relation, as illustrated in Fig. 2, and it is only the struts 32 which are caused to turn about their pivotal end connections. In the event that a steering mechanism is used to steer the axle 12 around curves, the axle will be horizontally turned relative to the car body 11. Such relative movement would cause the air springs 21 to be twisted or moved along the longitudinal axis of the car body 11 except for the provision of the restraining arms 23 and the resilient cushion 28. The struts 32 can only pivot to a limited extent in a longitudinal plane. However, in the event that the axle 12 is steered relative to the car body 11, the struts 32 and plates 29 are allowed to tilt as part of a rectangular frame with respect to the yokes 22 and turn to a slight extent in response to the steering forces applied to the journal boxes 16 to thereby allow the axle 12 to turn with respect to the longitudinal axis of the car body 11. The movement of the struts 32 and plates 29 relative to the yokes 22 and air springs 21 is permitted largely by reason of the resiliency of the cushions 28. The air springs 21 are maintained in their upright position by the restraining arms 23 at all times and upon completion of negotiation of a curve the axle steering mechanism will be positively returned to its initial position and the biasing action of the resilient cushions 28 will act to return the struts 32 and plates 29 to their normal positions with respect to the car body 11.

As illustrated in Fig. 2, the struts 32 and plate 29 of the right hand assembly upon the negotiation of a curve to the left will turn slightly with respect to the yoke 22 associated therewith and will tilt forwardly to allow the right hand end of the axle 12 to be moved forwardly in response to the turning forces applied thereby to a suitable axle steering mechanism. The struts 32 and plate 29 of the left hand side assembly, as viewed in Fig. 2, will turn slightly with respect to the yoke 22 and move rearwardly to allow the left end of the axle 12 to move rearwardly in response to steering forces applied thereto. As a result of these oppositely directed, laterally spaced steering forces the axle 12 will turn with respect to the longitudinal axis of the car body 11 and the wheels 13 will be steered into the curve. The relative movement of the struts 32 and plates 29 with respect to the remaining elements of the suspension system is accomplished by the resilient interconnection provided by the cushions 28 as previously described. In the event that it is desired to rely upon self-steering of the axle brought about by the camming action of the rails 15 on the flanges 14 of the wheels 13, elements of the suspension system will function in the same manner due to the resilient interconnection of the same. Self-steering action is available as the axle 12 may turn relative to the car body 11 against the biasing action of the resilient cushions 28 and ultimately be biased into returning to its normal position by the inherent resiliency of the cushions 28.

The yokes 22 and restraining arms 23, as previously described, function to maintain the air springs 21 in an upright position. In maintaining this relation these elements not only fixedly position the air springs with respect to the shell of the car body 11 and limit the air springs from longitudinal movement while allowing vertical movement of the same, but still further function to restrain movement of the axle 12 along the longitudinal axis of the car body 11. As the struts 32 pivot with respect to the air springs 21 and journal boxes 16 in transverse planes, any movement of the axle longitudinally of the car body 11 would, without the provision of the yokes 22 and their associated restraining arms 23, cause the air springs 21 to be moved forwardly or rearwardly of the car body 11. Such movement would of course be undesirable and, as a result, the combination of the limited movement of the yokes 22 and the limited pivotal interconnection of the struts 32 with both the air springs 21 and the journal boxes 16 restrains relative longitudinal movement between the axle 12 and the car body 11.

The journal box saddle members 40 and 42 may be readily dismounted from the journal boxes 16 by merely retracting the bolts 41 and removing the saddle member 42. In the event that it is necessary to rework the axle 12 or repair the journal boxes 16 or wheels 13, the car body 11 may be raised from supporting contact with the journal boxes 16 by merely jacking up the top saddle member 40. As a result, maintenance may be accomplished without the necessity of disassembling the suspension system. Furthermore, the axle steering mechanism being connected to the axle 12 through steering rods 45 connected to the bottom saddle members 42 need not be dismantled in any manner due to the complete disassociation of the bottom saddle member 42 with the journal box 16.

To describe the structural features of the resilient cushions 28 and their mounting with respect to the yokes 22 and plates 29 reference is made to Figs. 6–8. The yoke 22 is provided with a rectangular body portion 51 one side of which is integrally interconnected with the restraining arms 23. The outer periphery of the body portion 51 is provided with a continuous downwardly extending rib 52 which defines a groove-like portion 53 in the bottom surface of the body portion 51. Centrally of the body portion 51 is a circular aperture 54 which is defined by integral downwardly extending walls 55 forming a rectangular opening, which walls are provided with inturned flanges 56 at the bottom edges thereof which carry an abutment plate 57 attached thereto by threaded bolts 58. The walls 55 define a downwardly projecting aligning means which is received in a rectangular aperture 59 carried centrally of the plate 29. The side edges of the abutment plate 57 extend inwardly of the side edges of the opening 59 in the plate 29 and are positioned for contact with abutment projections 60 carried by the bottom surface of the plate 29 inwardly of the edges of the opening 59 therein. The top portion of the aperture 54 in the body portion 51 of the yoke 22 receives therein a bottom plate 61 of the air spring 21 which is suitably retained therein to interconnect the yoke 22 with the air spring 21. The downwardly directed walls 55 projecting through the opening 59 and the plate 29, and the attachment of the abutment plate 57 to the bottom flanges 56 operatively connects the yoke 22 and plate 29 for vertical relative movement therebetween as limited by the abutment plate 57.

Intermediate the bottom surface 53 of the yoke 22 and the top surface 62 of the plate 29 is located the resilient cushion 28 which is formed from a rectangular assembly having a central rectangular opening 63 received about the depending walls 55. The resilient cushion 28 is preferably formed from rubber and is bonded at its upper and lower surfaces to rigid plates 64. The top plate 64 bears against the bottom surface 53 of the yoke 22 and is retained between the downwardly directed rim-like edges 52 and the central downwardly depending walls 55. The bottom rigid plate 64 is connected to the upper surface of the plate 29 by means of bolts 65 passed through flanges 66 at the corners thereof.

As particularly shown in Fig. 7, the inner surfaces of the central aperture 63 of the resilient cushion 28 are in close association with the outer surfaces of the downwardly extending walls 55. This positioning, in combination with bottom rigid plate 64 being attached by the bolts 65 to the top surface 62 of the plate 29, fixes the cushion 28 in its proper position. Due to the inherent resiliency of the interconnecting cushion 28, relative movement is provided between the plate 29 and the yoke 22. Relative movement brought about between the yoke 22 and plate 29 must be caused by a force of sufficient magnitude to overcome the inherent resiliency or biasing action of the rubber cushion 28 and upon reduction of the magnitude of such a force, the inherent biasing action of the cushion 28 will overcome the same and return the plate 29 to its initial position with respect to the yoke 22. Due to this arrangement the axle 12 may be limitedly turned with respect to the longitudinal axis of the car body 11 to allow the wheels 13 carried thereby to be steered into and out of a curve. Any suitable axle steering mechanism capable of providing adequate torsional forces to the axle 12 to overcome the biasing action of the resilient cushion 28 may be used for this purpose.

The rubber cushions 28 not only provide resilient interconnecting portions between elements of the suspension system to allow turning of the axle 12 relative to the longitudinal axis of the car body 11, but these cushions absorb the lateral components of impact forces transmitted axially of the struts 32. By positioning the cushions 28 in the locations described, the integral yokes 22 and restraining arms 23 are prevented from transmitting the lateral components of impact forces into the car structure.

As can be readily appreciated from the foregoing description, the various elements of the suspension system cooperate with one another to provide a system of uncomplicated construction capable of providing a safe and comfortable ride during the operation of the car 10. The functioning of the resilient cushions 28 in interconnecting the lateral movement control means and the combined air springs and restraining means, cooperates with these elements to allow each of the same to independently and cooperatively operate in a highly efficient manner. By the combined functioning of these elements the axle 12 and its associated parts is maintained in its proper relation with respect to the car body 11 while the latter is allowed to move vertically and roll or bank with respect to the axle 12.

Each side assembly of the suspension system is ruggedly constructed, readily assembled and inexpensively maintained. The various elements of the suspension system are readily accessible for maintenance purposes and these elements are arranged to function in such a manner that long life operation is obtained.

Certain modifications and changes in the foregoing embodiment may be made without departing from the spirit and scope of the invention, and, therefore, only such limitations should be imposed as are indicated in the appended claims.

We claim:

1. In a suspension system for resiliently mounting a vehicle body on a wheel-carrying axle, the system comprising vertically acting resilient means connected with the body and providing the same with vertical movement relative to the axle, and lateral movement control means interconnecting said vertically acting means with said axle, the provision of biasing means interconnecting the lateral movement control means and the vertically acting means, said biasing means acting on the axle through the lateral movement control means to bias the axle to a position substantially at right angles to the longitudinal axis of the body, the biasing strength of said biasing means being inadequate to prevent the axle from turning relative to the longitudinal axis of the body in response to the application of a predetermined turning force thereto, said biasing means including a rubber-like cushion bonded to rigid means defining opposite substantially horizontal surfaces thereof, the rigid means along one of its surfaces being interconnected with the lateral movement control means and the rigid means along the other of its surfaces being operatively connected with the vertically acting means and fixed in relation to the body, said cushion being resiliently stressed when the axle is turned relative to the longitudinal axis of the body.

2. In a suspension system for resiliently mounting a vehicle body on a wheel-carrying axle, the system comprising vertically acting resilient means connected with the body and providing the same with vertical movement relative to the axle, restraining means attaching the vertically acting resilient means to the body to limit movement of the vertically acting resilient means longitudinally of the body, and lateral movement control means interconnecting said vertically acting means with said axle and being limitedly pivotally connected at its ends with the same for limited banking of the body in response to the action of centrifugal force, the provision of biasing means interconnecting the lateral movement control means and the vertically acting means, said biasing means acting on the axle through the lateral movement control means to bias the axle to a position substantially at right angles to the longitudinal axis of the body, the biasing strength of said biasing means being inadequate to prevent the axle from turning relative to the longitudinal axis of the body in response to the application of a pre-determined turning force thereto, said biasing means being in the form of a rubber-like cushion positioned for resilient stressing when the axle is turned relative to the longitudinal axis of the body, the biasing strength of the cushion cooperating with the restraining action of the restraining means and the limitedly pivotal end connections of the lateral movement control means to restrain movement of the axle and the lateral movement control means longitudinally of the body.

3. A suspension system for resiliently mounting a vehicle body on a wheel-carrying axle, said system comprising vertically acting resilient means connected with said body and providing the same with vertical movement relative to said axle, lateral movement control means interconnecting said vertically acting means with said axle, and biasing means interconnecting said lateral movement control means and said vertically acting means, said biasing means acting on said axle through said lateral movement control means to bias the axle to a position substantially at right angles to the longitudinal axis of said body, the biasing strength of said biasing means being inadequate to prevent said axle from turning relative to said axis in response to the application of a predetermined turning force thereto, said biasing means including a rubber-like cushion bonded to rigid means on two substantially horizontal surfaces thereof, the rigid means along one of its surfaces being interconnected with said lateral movement control means and the rigid means along the other of its surfaces being operatively connected with said vertically acting means, said cushion being positioned for resilient stressing when said axle is turned relative to said axis, said lateral movement control means being limitedly pivotally mounted at its ends for limited banking action of said body in response to the action of centrifugal force.

4. A suspension system for resiliently mounting a vehicle body on a wheel-carrying axle, said system comprising vertically acting resilient means connected with said body and providing the same with vertical movement relative to said axle, lateral movement control means interconnecting said vertically acting means with said axle, biasing means interconnecting said lateral movement control means and said vertically acting means, said biasing means acting on said axle through said lateral movement control means to bias the axle to a position substantially at right angles to the longitudinal axis of said body, the biasing strength of said biasing means being inadequate to prevent said axle from turning relative to said axis in response to the application of a predetermined turning force thereto, said biasing means including a rubber-like cushion bonded to rigid means along two substantially horizontal surfaces thereof, the rigid means along one of its surfaces being interconnected with said lateral movement control means and the rigid means along the other of its surfaces being operatively connected with said vertically acting means, said cushion being positioned for resilient stressing when said axle is turned relative to said axis, said vertically acting resilient means being in communication with fluid pressure supply means which is operative in response to the weight of said body to maintain the same through said vertically acting resilient means at a predetermined vertical relation with said axle, said lateral movement control means being limitedly pivotally mounted at its ends for limited banking action of said body in response to the action of centrifugal force, and restraining means attaching said vertically acting resilient means to said body to limit movement of the vertically acting resilient means longitudinally of said body, said cushion being positioned in line with the longitudinal axis of said lateral movement control means to absorb components of impact forces transmitted axially by said lateral movement control means.

5. A suspension system for resiliently supporting a vehicle body with respect to an axle, said system including vertically acting fluid pressurized springs laterally spaced with respect to the longitudinal axis of said body, each of the springs being operatively connected with a pair of struts extending downwardly therefrom in an outwardly direction into attachment with journal boxes carried on the outer ends of said axle, said struts each being limitedly pivotal both with respect to said springs and said journal boxes by reason of torsion members carried by each of the ends thereof, each of said torsion members including a shear-resistant sleeve of resilient material having its inner surface bonded to a rigid sleeve which is fixed relative to a member about which a strut pivots, and its outer surface bonded to a rigid sleeve which is fixed relative to a strut end, said resilient material providing for limited torsional movement by said outer sleeve from a first position with respect to said inner sleeve and acting to return said outer sleeve to its first position relative to said inner sleeve upon the relieving of torsional stresses applied thereto, biasing means interconnecting said struts with said springs to bias the axle to a position substantially at right angles to the longitudinal axis of said body, the biasing strength of said biasing means being inadequate to prevent said axle from turning relative to the longitudinal axis of said body in response to the application of a predetermined turning force thereto, said biasing means including a rubber-like cushion bonded to rigid means along two surfaces thereof, the rigid means along one of its surfaces being interconnected with said struts and the rigid means along the other of its surfaces being operatively connected with said springs, said cushion being positioned for resilient stressing when said axle is turned relative to the longitudinal axis of said body, restraining means attaching said springs to said body to limit movement of said axle and said system longitudinally of said body, and fluid supply means connected with said springs to regulate the fluid pressure carried thereby in response to relative movement of said body and said restraining means.

6. A suspension system for resiliently mounting a vehicle body on a wheel-carrying axle, said system comprising vertically acting fluid pressurized springs laterally spaced with respect to the longitudinal axis of said body, each of the springs being operatively connected with a pair of struts extending downwardly therefrom on opposite sides thereof in an outwardly direction into attachment with journal boxes carried on the outer ends of said axle, said struts each being limitedly pivotal both with respect to said springs and said journal boxes by reason of resilient interconnecting means carried by each of the ends thereof, said resilient interconnecting means functioning to bias said body into an upright position while allowing said body to bank inwardly of a curve in response to the action of centrifugal force, the pivotal action provided by said resilient interconnecting means occurring primarily in a plane transverse of the longitudinal axis of said body, biasing means interconnecting said struts with said springs to bias the axle to a position substantially at right angles to the longitudinal axis of said body, the biasing strength of said biasing means being inadequate to prevent said axle from turning relative to the longitudinal axis of said body in response to the application of a predetermined turning force thereto, said biasing means including a rubber-like cushion bonded to rigid means along two surfaces thereof, the rigid means along one of its surfaces being interconnected with said struts and the rigid means along the other of its surfaces being operatively connected with said springs, said cushion being resiliently stressed when said axle is turned relative to the longitudinal axis of said body, and restraining means in the form of a wishbone having a yoke portion anchored with said springs to function with the rigid means bonded to said other surface of said cushion, the arms of said wishbone pivotally connecting the yoke thereof to said body on horizontal axes for cooperative functioning with said biasing means and the resilient interconnecting means of said struts to limit movement of said axle and said system longitudinally of said body.

References Cited in the file of this patent

UNITED STATES PATENTS

| | | |
|---|---|---|
| 2,225,242 | Van Dorn et al. | Dec. 17, 1940 |
| 2,252,789 | Van Dorn | Aug. 19, 1941 |
| 2,474,471 | Dolan | June 28, 1949 |
| 2,523,113 | Hanna et al. | Sept. 19, 1950 |
| 2,633,811 | Poage | Apr. 7, 1953 |
| 2,647,470 | MacVeigh | Aug. 4, 1953 |
| 2,648,536 | Udstad | Aug. 11, 1953 |
| 2,687,099 | MacVeigh | Aug. 24, 1954 |
| 2,781,731 | Furrer | Feb. 19, 1957 |
| 2,785,640 | Furrer | Mar. 19, 1957 |
| 2,874,647 | Candlin | Feb. 24, 1959 |
| 2,893,326 | Browne et al. | July 7, 1959 |

FOREIGN PATENTS

| | | |
|---|---|---|
| 157,620 | Australia | July 13, 1954 |